US008620970B2

(12) United States Patent
English et al.

(10) Patent No.: US 8,620,970 B2
(45) Date of Patent: Dec. 31, 2013

(54) METHODS AND APPARATUS FOR CHANGING VERSIONS OF A FILESYSTEM

(75) Inventors: Robert English, Sunnyvale, CA (US); Ram Kesavan, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 374 days.

(21) Appl. No.: 11/542,777

(22) Filed: Oct. 3, 2006

(65) Prior Publication Data
US 2008/0082589 A1 Apr. 3, 2008

(51) Int. Cl.
*G06F 12/00* (2006.01)
*G06F 17/30* (2006.01)
*G06F 7/00* (2006.01)

(52) U.S. Cl.
USPC ............................ 707/809; 707/822; 707/803

(58) Field of Classification Search
USPC ........................................................ 707/204
See application file for complete search history.

(56) References Cited

U.S. PATENT DOCUMENTS

| | | | | |
|---|---|---|---|---|
| 4,318,184 A * | 3/1982 | Millett et al. | | 1/1 |
| 4,611,298 A * | 9/1986 | Schuldt | | 1/1 |
| 5,742,818 A * | 4/1998 | Shoroff et al. | | 1/1 |
| 5,819,043 A * | 10/1998 | Baugher et al. | | 709/222 |
| 5,829,053 A * | 10/1998 | Smith et al. | | 711/202 |
| 5,963,967 A * | 10/1999 | Umen et al. | | 715/236 |
| 5,999,940 A * | 12/1999 | Ranger | | 1/1 |
| 6,148,412 A * | 11/2000 | Cannon et al. | | 714/6 |
| 6,185,666 B1 * | 2/2001 | Murray et al. | | 711/173 |
| 6,205,455 B1 * | 3/2001 | Umen et al. | | 715/236 |
| 6,327,584 B1 * | 12/2001 | Xian et al. | | 1/1 |
| 6,366,987 B1 * | 4/2002 | Tzelnic et al. | | 711/162 |
| 6,377,958 B1 | 4/2002 | Orcutt | | |
| 6,460,052 B1 * | 10/2002 | Thomas et al. | | 707/695 |
| 7,167,856 B2 * | 1/2007 | Lawder | | 1/1 |
| 7,191,182 B2 * | 3/2007 | Anonsen et al. | | 1/1 |
| 7,257,652 B2 * | 8/2007 | Gilliam et al. | | 710/38 |
| 2002/0138502 A1 * | 9/2002 | Gupta | | 707/200 |
| 2002/0143733 A1 * | 10/2002 | Mukkamalla et al. | | 707/1 |
| 2003/0154220 A1 * | 8/2003 | Cannon | | 707/204 |
| 2004/0010487 A1 * | 1/2004 | Prahlad et al. | | 707/1 |
| 2004/0073581 A1 * | 4/2004 | McVoy et al. | | 707/203 |
| 2004/0105587 A1 * | 6/2004 | Nomizu | | 382/232 |
| 2004/0117412 A1 * | 6/2004 | Tran et al. | | 707/203 |
| 2004/0186817 A1 * | 9/2004 | Thames et al. | | 707/1 |

(Continued)

FOREIGN PATENT DOCUMENTS

WO WO-2005/078603 8/2005

OTHER PUBLICATIONS

N.C. Shu; Express: A data Extraction, Processing and Restructuring System; 1977; ACM;vol. 2 No. 2 pp. 134-174.*

(Continued)

*Primary Examiner* — Shew-Fen Lin
*Assistant Examiner* — Jermaine Mincey
(74) *Attorney, Agent, or Firm* — Perkins Coie LLP (57) ABSTRACT

A filesystem can be converted to a different version by creating a new data structure according to a new format of the different version and transforming the data from the filesystem to the new data structure. Transforming the data can include changing the format of the data in the filesystem to be compatible with the new data structure format. The data may be incorporated into the new data structure by copying the data, or creating indirect reference mechanisms to point to the original data.

26 Claims, 8 Drawing Sheets

(56) References Cited

U.S. PATENT DOCUMENTS

| | | | |
|---|---|---|---|
| 2004/0205152 A1* | 10/2004 | Yasuda et al. | 709/217 |
| 2004/0254964 A1* | 12/2004 | Kodama et al. | 707/204 |
| 2005/0060330 A1* | 3/2005 | Sonoda et al. | 707/100 |
| 2005/0091291 A1* | 4/2005 | Kaler et al. | 707/203 |
| 2005/0125461 A1* | 6/2005 | Filz | 707/203 |
| 2005/0187989 A1* | 8/2005 | Kaneko | 707/203 |
| 2005/0192974 A1* | 9/2005 | DeLorme et al. | 707/100 |
| 2005/0203969 A1* | 9/2005 | Kawabe | 707/203 |
| 2005/0216788 A1* | 9/2005 | Mani-Meitav et al. | 714/6 |
| 2005/0246397 A1* | 11/2005 | Edwards et al. | 707/204 |
| 2006/0129508 A1* | 6/2006 | Cannon et al. | 707/1 |
| 2007/0112891 A1 | 5/2007 | Marriott et al. | |
| 2007/0179994 A1* | 8/2007 | Deguchi et al. | 707/202 |

OTHER PUBLICATIONS

International Search Report PCT/US2007/021359 dated Jun. 4, 2008; pp. 1-3.

Written Opinion PCT/US2007/021359 dated Jun. 4, 2008; pp. 1-5.

Office Action dated Jul. 24, 2009 in co-pending European Application No. 07 852 543.3-2201 filed Oct. 3, 2007.

* cited by examiner

METHODS AND APPARATUS FOR CHANGING VERSIONS OF A FILESYSTEM

FIELD

Embodiments of the invention relate to network storage systems, and more particularly, to changing a filesystem of a network storage system from one version to another.

BACKGROUND

A storage system can be networked and shared among one or more computing devices, which can be clients of the storage system. The storage system generally includes multiple storage devices or storage resources, including interconnecting hardware and control hardware. The control hardware may be referred to as a storage server, which is a special-purpose processing device used to store and retrieve data on behalf of the clients, which may access and/or process the data. The storage system provides a filesystem and/or other software to manage the data storage area of the storage resources. The data storage area is often divided into data blocks, which are managed by the filesystem. The filesystem determines how and where data will be stored and retrieved. The storage resources can be organized into one or more groupings (physical and/or logical or virtual) of redundant array of inexpensive/independent disks/drives (RAID). The data may be organized, managed, and/or accessed as data files. The data alternatively may be organized and managed and/or accessed as data blocks, which may include more or less information than a file. Hence, the storage server may be a file server that provides clients with file-level access to data, and/or a storage server that provides clients with block-level access to stored data.

A storage server can have access to multiple mass storage devices, i.e., persistent/non-volatile storage devices, which may be managed based on logical or virtual organization. Data storage across these multiple mass storage devices can be organized into multiple layers of abstraction to provide fault tolerance, as individual disks can (and do) fail. The abstraction layers also allow a logical disk organization, for example, a volume or aggregate, to store larger quantities of data than can fit on a single disk.

For example, a storage server may represent a group of storage devices (e.g., hard disks) as a logical aggregate/grouping of storage devices. The aggregates may be managed to store data in volumes contained within the aggregates. As used herein, "volume" refers to a logical abstraction of physical storage, combining one or more disks or parts of disks into a single logical storage object. The volumes may in turn be further logically broken down into plexes containing RAID groups. The RAID groups may use storage from multiple, separate disks. While particular terminology is used herein as a reference point to describe particular organizations and/or functions herein, the terminology shall not be construed as limiting, but rather by way of example. Where particular terminology is referred to (e.g., an aggregate, a plex, etc.), these are to be understood as merely examples of data structure abstractions that may be substituted with equivalent or similar data structures that may be referred to by other terms.

A filesystem includes a format that affects how data is stored and/or retrieved. The format, features and/or level of performance of a filesystem may be changed as developments in the technology surrounding the storage system change. Thus, a filesystem in a storage server may be changed from one version to another during the operational life of the storage server. Changing a filesystem version may be performed in connection with a filesystem upgrade, or a filesystem revert (changing back to a previous version, e.g., for testing, or if the upgrade results in errors). Although upgrade of a filesystem can occur on the fly, the mechanisms involved in changing filesystem versions have traditionally been custom builds for revert. Newer versions of a filesystem generally understand the older version, or are "backwards compatible" with the older version of the filesystem. However, older versions of a filesystem traditionally do not understand the newer version of the filesystem. Thus, revert is an asymmetric process, meaning that traditionally every upgrade and revert is a custom design that can be difficult to test, difficult to design, and time consuming. Reverting a filesystem to a different version traditionally requires taking the system offline, reverting to the older format, and then rebooting with the older filesystem. Additionally, changing from one filesystem to another is traditionally thought of in terms of changing versions of the same filesystem. Traditionally there is no mechanism to change on the fly from one filesystem type to a different type of filesystem. Therefore, there may be significant cost in terms of time and money associated with a filesystem version change.

SUMMARY

A transformer module can convert a filesystem from one version to another. The transformer module generates a new data structure in the free space of the original filesystem to be converted, and incorporates the data of the original filesystem into the new data structure. The new data structure created in the free space of the original filesystem has the format of the new version of the filesystem.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are understood as describing a particular feature, structure, or characteristic included in at least one implementation of the invention. Thus, the appearance of phrases such as "in one embodiment," or "in an alternate embodiment," do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

A conversion of a filesystem from one version to another can be accomplished by providing a mechanism to generalize the process, allowing for reuse of code and concept from one conversion to another and/or from upgrade to revert. Thus, a generalized conversion or transformation module enables a transformation from one type of filesystem to another, an upgrade from one version of a filesystem to an updated version, or a revert from one version of a filesystem to a previous version. As used herein, an upgrade refers to a change from one version of a filesystem to a newer version of the same filesystem, or from one type of filesystem to another (e.g., from Solaris® of Sun Microsystems, Inc. to WAFL® of Network Appliance, Inc.), and a revert refers to the reverse change as an upgrade, i.e., a change from one version of a filesystem to a former version of the same filesystem. A filesystem manages how a storage system stores, accesses, and/or otherwise manages data. A change to a filesystem may mean that data is handled in a different manner from one version to another. A filesystem as discussed herein generally refers to a set of procedures for managing a storage system. The change to the filesystem is performed on the fly, which allows the filesystems to remain available and online to clients. For example, the filesystem can be available to serve data requests while being transformed with a background process.

A storage system refers to a storage server with accompanying storage to provide clients with file-level services, and may, alternately or in addition, provide clients with block-level access to stored data. The storage may be one or more subsystem of redundant arrays of mass storage devices, e.g., RAID, or any other configuration where data on a given mass storage device can be recovered by using a subset of other mass storage devices within a protection unit. The filesystem defines the function of one or more storage access requests (e.g., input/output (I/O) functions (or operations or transactions)). I/O functions include disk read request (or simply "read") or disk write request (or simply "write"). As used herein, a mass storage device refers to any type or form of non-volatile storage device/means suitable for storing data. Mass storage devices include, but are not limited to, conventional magnetic disks (e.g., hard disks), optical disks (e.g., CD-ROM (compact disk—read only memory), DVD (digital video/versatile disc) based storage), semiconductor-based storage (e.g., flash), etc. Mass storage devices may be referred to as disks, drives, storage units, hard disk, etc.

The organization of disks into protection units refers to RAID groups, or any similar/comparable logical grouping of disks for fault tolerance. The filesystem operates in conjunction with the logical grouping abstraction controller (e.g., a RAID controller) that manages the physical interfacing of the system to the hardware. Many types of RAID arrays or other redundant disk arrays are known, many based on standards, and others proprietary. As used herein, "RAID group" refers generically to any type of RAID array, or redundant disk array. Reference to a "logical grouping" of disks is an abstraction that refers to any one or more of multiple layers of logical organization of physical resource, for example, a RAID group, and/or groupings of RAID groups. The protection units can be part of a storage system managed by a storage server. The storage server manages the storage system by providing disk access services.

As used herein, reference to a storage server providing disk access services, or otherwise servicing a data access request refers to one or more operations, which can include one or more of a read request, a write request, or an administrative request or other I/O operation. Servicing a request (or a write or other I/O request/operation) refers to processing, accessing data, writing data, responding to, performing actions or operations as a result of, etc., the request. In one embodiment a filesystem employed with this technique allows for writing out of place, or writing anywhere. Writing out of place is in contrast with a write-in-place approach where a data block, when modified, is written to the same physical location on disk. With write out of place, any time a data block is modified it is written to a new physical location on disk. A filesystem that has a write anywhere property can write to any unallocated block on any available disk in a group, and does not have to write to a particular location for a particular "file" or block of data. A write out of place filesystem stores data writes in unallocated blocks instead of writing over already allocated data blocks. Thus, data is not overwritten, and a particular disk/block is not used for any subsequent write that changes data stored at the particular disk/block. A filesystem may have one or both of these properties (i.e. write out-of-place and/or write anywhere). An example of a filesystem with both properties is the Write Anywhere File Layout (WAFL®) filesystem included in Filer products made by Network Appliance, Inc. of Sunnyvale, Calif.

As discussed above, the storage resources can be organized into virtual or logical groups, managed by the filesystem, which may include aggregates (a logical collection of physical disks, which may have multiple volumes) and/or volumes (a logical container/grouping of storage). In one embodiment a storage system provides a sparse volume, which refers to a volume that may be created with hooks into an already existing volume. For example, if data existed in an existing volume, a "sparse" volume could be created with one or more pointers to the existing data rather than duplicating the existing data into the new volume, which allows the raw data to remain in its physical location and be included within a different logical organizational data structure.

The use of sparse volumes can allow for generic filesystem transformation, or conversion. Instead of viewing an old aggregate or other logical data structure as something to be converted into a new, comparable logical data structure, a new aggregate can be generated in the free space of the original aggregate. The new aggregate can contain sparse volumes, with its data being filled from the old volumes by simply pointing to existing buffers. In such a conversion framework, converting from one filesystem format to another can be reduced to simply providing a kernel to understand the original file system format. Through the use of sparse volumes, upgrade and revert can be considered special cases of a generic transformation operation, which in turn reduces the likelihood of needing a custom design to perform upgrade/revert.

With a generic conversion mechanism, instead of "teaching" a new version or release of a filesystem how to understand an old version or release, the old releases can be taught how to understand the new one. Thus, a conversion from one filesystem version to another can be performed using two kernels, or core service software. One kernel is installed to provide the new filesystem that will be generated within the free space of the original filesystem. The second kernel provides a translation mechanism, or interpreter, to allow the new filesystem to understand the format of the original filesystem. Thus, for example, the interpreter for release 9.0 serves to upgrade release 9.0 to release 10.0, or to revert release 9.0 to release 8.0. The generic conversion mechanism provides for simple testing, because most testing can be accomplished by testing the interpreter within the context of its own release.

The source and destination filesystems (i.e., the original and new filesystems, respectively) do not need to be of the same type. For example, the system could be changed from a SPARC system available from SUN MICROSYSTEMS, INC. of Santa Clara, Calif., to a WAFL system of Network Appliance. All filesystems include free space, and the conversion simply makes use of the free space. Additionally, the conversion mechanism could be used to split larger logical data structures into smaller ones, or combine smaller logical data structures into larger ones.

Another implementation includes data replication. Because the conversion mechanism can be used to "teach" a filesystem to understand another filesystem, a new filesystem that understands the data of the system to be duplicated can be created, and the data filled into the new filesystem. Thus, a volume could be written from one filesystem of one storage server to another, even if the separate storage servers are executing different filesystem versions.

Figure 1:
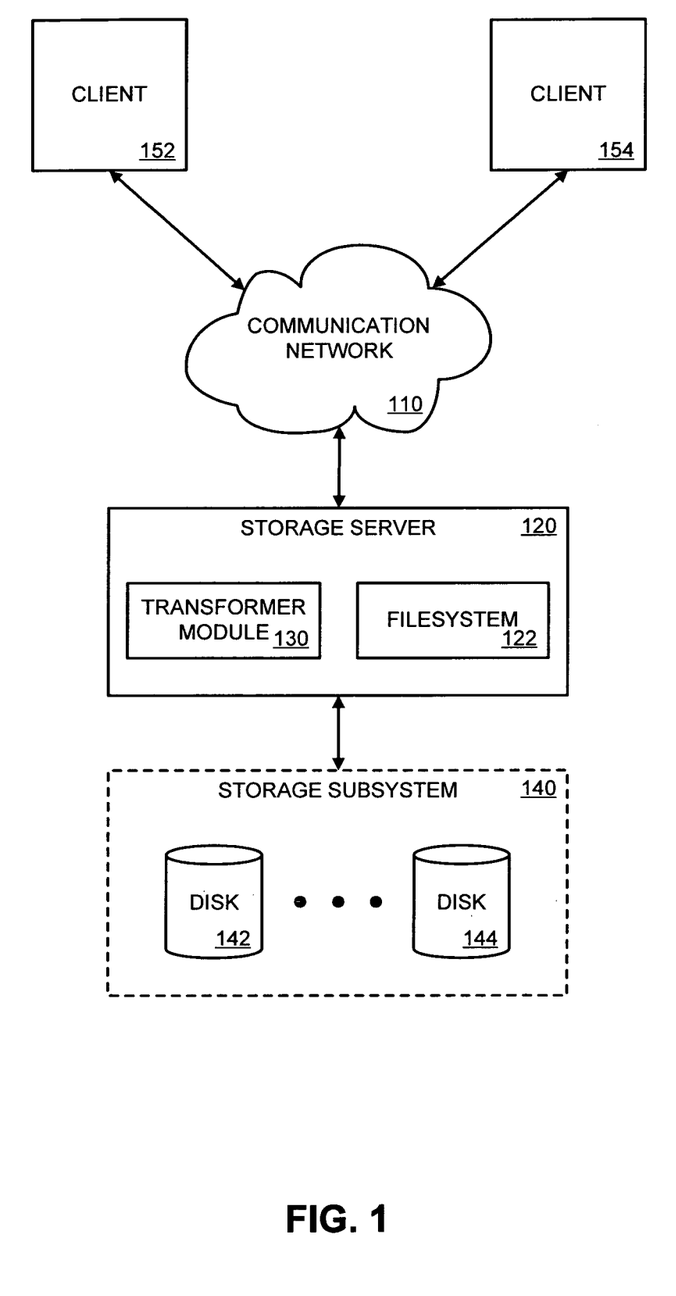
FIG. 1 is a block diagram of an embodiment of a storage system including a storage server with a transformer module.

FIG. 1 is a block diagram of an embodiment of a storage system including a storage server with a transformer module. The system includes clients 152-154, which represent devices coupled to communication network 110. Communication network 110 may be, for example, a local area network (LAN), wide area network (WAN), metropolitan area network (MAN), global area network (GAN) such as the Internet, or any combination thereof. Network 110 can include connection hardware (e.g., Category-5 or other twisted pair cable, coaxial cable, wireless communication transceivers), as well as flow direction hardware (e.g., interface circuits/cards, switches, routers, servers). Each client 152 and 154 may be a conventional desktop computer, a laptop computer, workstation, a network server, mobile device such as a cellular telephone or PDA (personal digital assistant), etc. Clients 152 and 154 generate requests for access to data on storage subsystem 140. Storage server 120 services the requested access functions to clients 152-154, depending on what request is made, what permissions a client has, etc.

Storage server 120 represents one example of a storage server, and includes transformer module 130, which enables storage server 120 to transform filesystem 122 that manages client storage devices 162-164 from one version to another. Storage server 120 may provide clients with file-level services, as with traditional file servers; alternately, or in addition, storage server 200 may provide clients with block-level access to stored data. Thus, as used herein storage server 120 should be understood to be a storage server that provides file-based (e.g., NAS (network attached storage)) services, or alternatively, or in addition, a storage server that provides block-based (e.g., SAN (storage area network)) services. The data services, whether file-level or block-level, include providing access to storage subsystem 140, for either data storage and/or data retrieval.

Storage server 120 may have a distributed architecture. Thus, in one embodiment storage server 120 may include a separate N-("network") blade and a D-(disk) blade (neither shown in FIG. 1). In such an implementation the N-blade couples storage server 120 to communication network 110 to communicate with clients 152-154, and the D-blade includes the file system/storage management functionality and couples storage server 120 to storage subsystem 140 to communicate with the corresponding storage resources. As for access to storage devices 162-164, either the N-blade could be modified to include data access services with respect to storage available on the clients, and/or the D-blade is modified to include network services to access the storage available on the clients. The N-blade and D-blade communicate with each other using an internal protocol. Alternatively, storage server 120 may have an integrated architecture, where the network and data components are contained within a single box and/or single circuit component/manufacture. Storage server 120 further may be coupled through a switching fabric to other similar filers/file servers (not shown), each having its own local storage subsystem. In this way, one or more storage subsystems can form a single storage pool, to which a client of any of the file servers may be provided access.

Storage server 120 may be coupled locally to storage subsystem 140, which includes one or more mass storage devices 142-144. Mass storage devices 142-144 in storage subsystem 140 may be, for example, conventional magnetic disks (e.g., hard disks), optical disks such as CD-ROM or DVD based storage, magneto-optical (MO) storage, semiconductor-based, and/or any other type of non-volatile storage devices suitable for storing large quantities of data. Storage server 120 includes one or more connectors and/or connection ports with which to couple to storage subsystem 140 and/or one or more of its sub-elements. The connectors and/or ports may be connection points for fiber optic cable, coaxial cable, twisted-pair communication lines, and/or secure wireless connections. Storage server 120 manages storage subsystem 140, including receiving and processing read and/or write requests to data stored in storage subsystem 140, maintaining data structures, organizing the physical resources of storage subsystem 140 into logical storage resources, etc. The data structure and logical storage resources are constructs for storage management to allow more storage in a system, provide reliability in storage access, etc.

Storage server 120 includes transformation module 130, which represents one or more hardware and/or software components/modules to enable transformation of a filesystem from one version or format to another. Transformer module 130 may include a translation mechanism to allow a particular format of a filesystem understand another format of a filesystem. A new logical data structure is generated in the free space of an original logical data structure, and the new data structure filled with the data of the original data structure.

Figure 2:
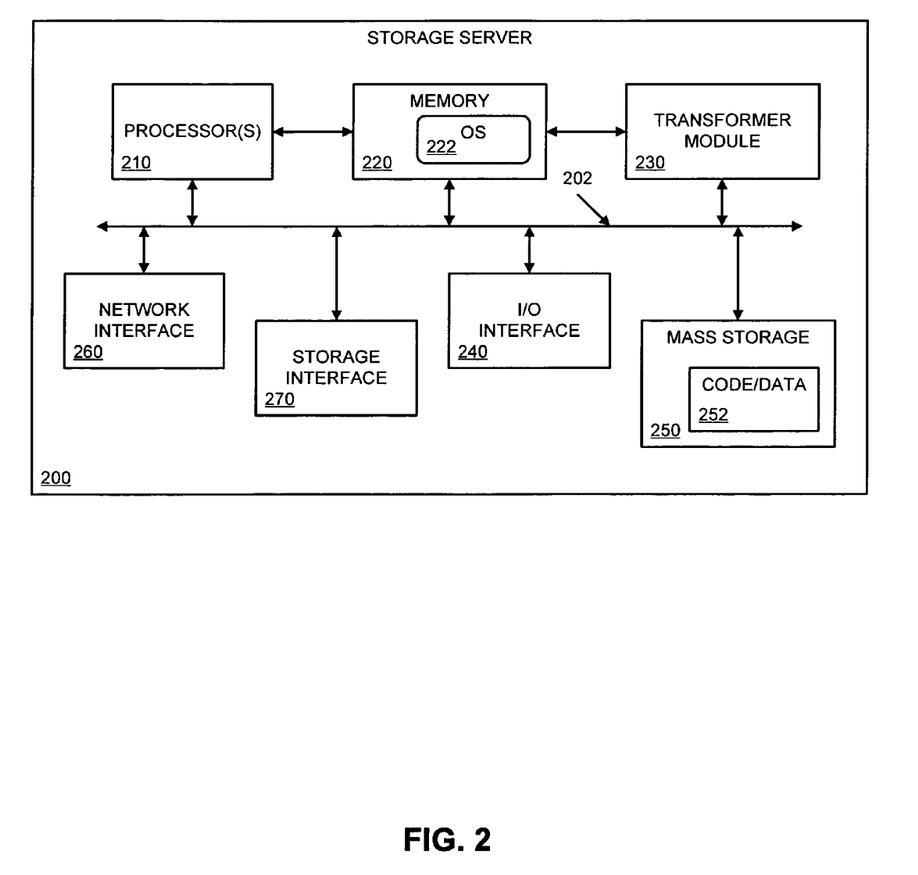
FIG. 2 is a block diagram of an embodiment of a storage server.

FIG. 2 is a block diagram of an embodiment of a storage server. Storage server 200 provides an example of a storage server, and may be one example of storage server 120 of FIG. 1. Storage server 200 includes one or more processors 210, and memory 220 coupled to processor 210. Processor 210 may include any type of microprocessor, central processing unit (CPU), processing core, etc., suitable for executing the functions of storage server 200 within the performance criteria determined for the system design, including managing client storage. Processor 210 controls the overall operation of storage server 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 represents the main memory of storage server 200 to provide temporary storage for code or data to be executed/operated on by processor 210. Memory 220 may include read-only memory (ROM), flash memory, one or more varieties of random access memory (RAM), or the like, or a combination of such devices or technologies. Memory 220 stores, among other things, operating system (OS) 222 that provides one or more functions of storage server 200. OS 222 may include one or more functions for client storage integration and management.

In one embodiment storage server 200 includes transformer module 230, which provides the ability of storage server 200 to transform from one version of a filesystem to another. The ability to transform the filesystem includes the ability to generate and provide a translator or interpreter that updates the filesystem. The updated filesystem is then managed by storage server 200. Transformer module 230 depicted in FIG. 2 is an abstraction to represent the one or more functions provided by storage server 200 to perform functions related to filesystem conversion. The functions provided to implement client storage integration/management may be provided as a separate module, as shown, or may be provided by one or more components of OS 222 or as a software module distinct from OS 222. Thus, transformer module 230 is to be understood as merely illustrative of the functionality provided to provide integrated storage server management of client storage, and is not limited to a particular implementation. Transformer module 230 could be provided as a programmable circuit component coupled to bus system 202, as part of OS 222, as part of an application/program executing on top of OS 222, or some combination of these.

Processor 210 and memory 220 are coupled to bus system 202. Bus system 202 is an abstraction that represents any one or more separate physical buses, communication lines/interfaces, and/or point-to-point connections, connected by appropriate bridges, adapters, and/or controllers. Therefore, bus system 202 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Also coupled to processor 210 through bus system 202 are one or more network interface(s) 260, one or more storage interface(s)/adapter(s) 270, one or more input/output (I/O) interface(s) 240, and one or more internal mass storage device(s) 250. Network interface 260 provides storage server 200 with the ability to communicate with remote devices (e.g., clients) over a network and may be, for example, an Ethernet adapter. Storage interface 270 enables storage server 200 to access a storage subsystem and/or client storage and may be, for example, a Fibre Channel adapter, a SCSI adapter, a network adapter, etc. Storage server 200 may typically be accessible to electronic or computer "users" rather than human users. Thus, I/O interface 240 may include one or more interface components to connect storage server 200 with other electronic equipment, for example, custom connections, blade adapters, etc. Additionally, storage server 200 could be made to be accessible to a human user, and thus have video, audio, and/or alphanumeric interface through I/O interface 240. Internal mass storage 250 may be or include any conventional medium for storing large volumes of data in a non-volatile manner. Mass storage 250 may hold data/instructions in a persistent state (i.e., the value is retained despite interruption of power to storage server 200). In a generic sense mass storage 250 is a "memory," although memory 220 is the executing or operating memory to provide instructions to processor 210. In one embodiment mass storage 250 includes code and/or data 252 that may be accessed and placed in memory 220 for execution by processor 210. Code/data 252 may include machine instructions to provide conversion functions.

Figure 3:
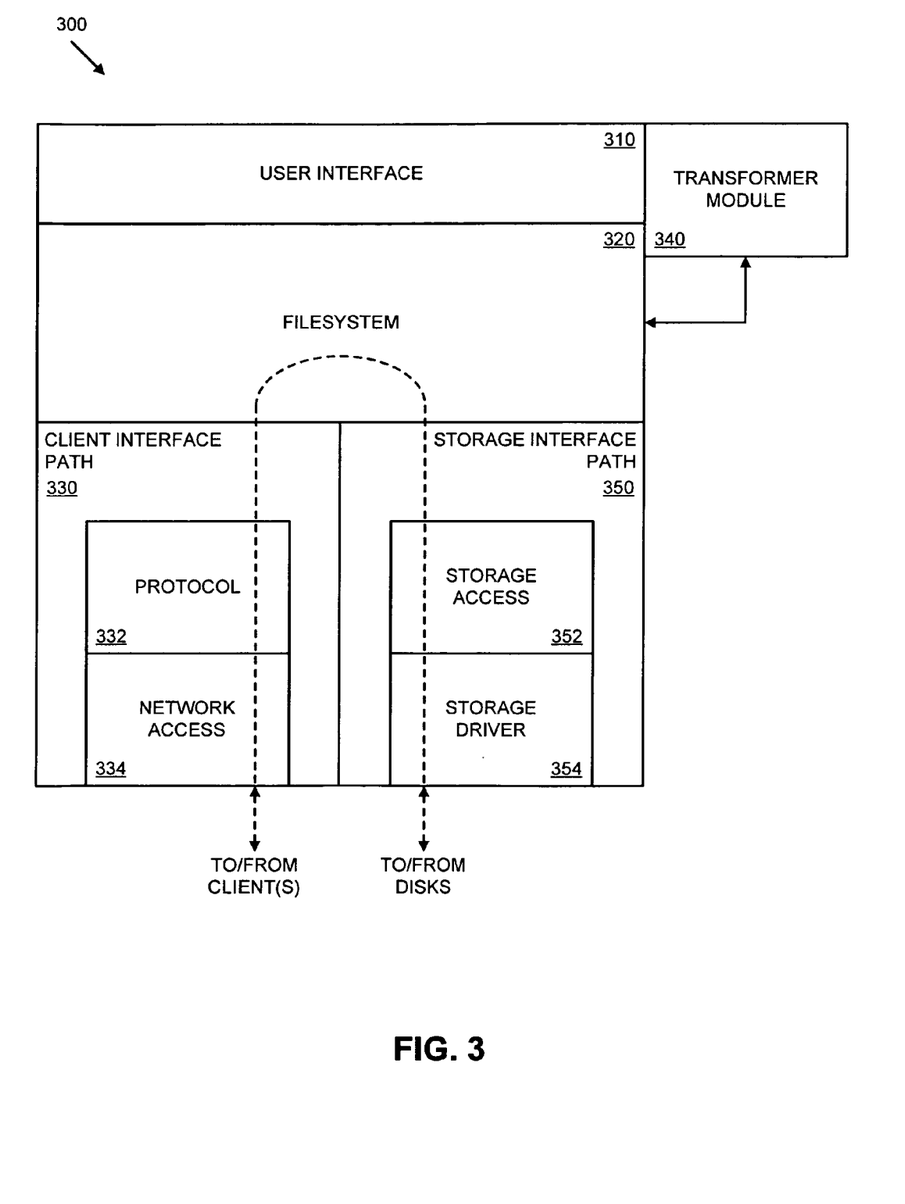
FIG. 3 is a block diagram of an embodiment of a storage server operating system.

FIG. 3 is a block diagram of an embodiment of a storage server operating system. Operating system 300 is one example of an operating system that could implement OS 222 of FIG. 2. As shown, operating system 300 includes several modules or functional components, which may also be referred to as "layers." One layer includes user interface 310, to provide access to a user, for example, a human storage network administrator, a management system, a diagnostic server, etc. Filesystem 320 is located logically below user interface 310. Filesystem 320 is a software kernel managed by the operating system that tracks/maintains a directory structure (hierarchy) of data stored in an associated storage subsystem, and manages read/write operations on the data (i.e., executes read/write operations on the disks in response to requests). Logically below filesystem 320, operating system 300 also includes client interface path 330, and storage interface path 350.

Client interface path 330 is depicted with protocol layer 332 and network access layer 334 associated with protocol layer 332, to allow filesystem 320 access over a network with clients, and particularly to client applications. Client interface path 330 may be understood to include more components than what are depicted in FIG. 3. Protocol layer 332 implements one or more of various higher-level network protocols, such as Network File System (NFS), Common Internet File System (CIFS), Hypertext Transfer Protocol (HTTP) and/or Transmission Control Protocol/Internet Protocol (TCP/IP), Fibre Channel Protocol (FCP), and/or iSCSI Protocol (SCSI over TCP/IP). The protocol may be different for separate connections to different clients. The protocol may be established prior to operation of the system, or negotiated at run time. Network access layer 334 includes one or more drivers or other medium-interface software routines/programs that implements a lower-level protocol to implement the protocol of protocol layer 332 in a physical interface to communicate over the network, such as Ethernet.

Storage interface path 350 includes storage access layer 352 and storage subsystem driver layer 354. Storage interface path 350 is also to be understood as merely representative, and may include more components and/or layers than what are depicted. Storage access layer 352 implements a disk storage protocol, such as RAID, and storage subsystem driver layer 354 implement a lower-level disk access protocol, such as Fibre Channel Protocol (FCP), SCSI, advanced technology attachment (ATA), serial ATA (SATA), serial attached storage (SAS), etc., which may implement commands/requests made by the higher level protocol. To facilitate the description of the following details herein, it will be assumed that storage access layer 352 implements RAID, such as RAID-4, RAID-DP (created by Network Appliance Inc.), etc., and therefore may alternatively be referred to as RAID layer 352. FIG. 3 also shows a dashed line to represent a data flow path between a client and a data source, through the layers of client interface path 330, filesystem 320, and storage interface path 350.

In one embodiment OS 300 includes transformer module 340, which is an example implementation of a transformer module as previously discussed. In one embodiment transformer module 340 is part of OS 300. In another embodiment transformer module 340 is external to OS 300 and interfaces with OS 300. Specifically, transformer module 340 interacts with filesystem 320, to build one or more logical data structures (e.g., volumes) in the free space of filesystem 320. Transformer module 340 includes a translation engine to allow for conversion of the format of the original filesystem to the format of the new filesystem.

Transformer module 340 may include hardware, software, and/or a combination of these. In a case where module 340 includes software, the software data, instructions, and/or configuration may be provided via an article of manufacture by a machine/electronic device/hardware. An article of manufacture may include a machine accessible/readable medium having content to provide instructions, data, etc., that causes or results in an electronic device performing various operations or executions described herein. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 4:
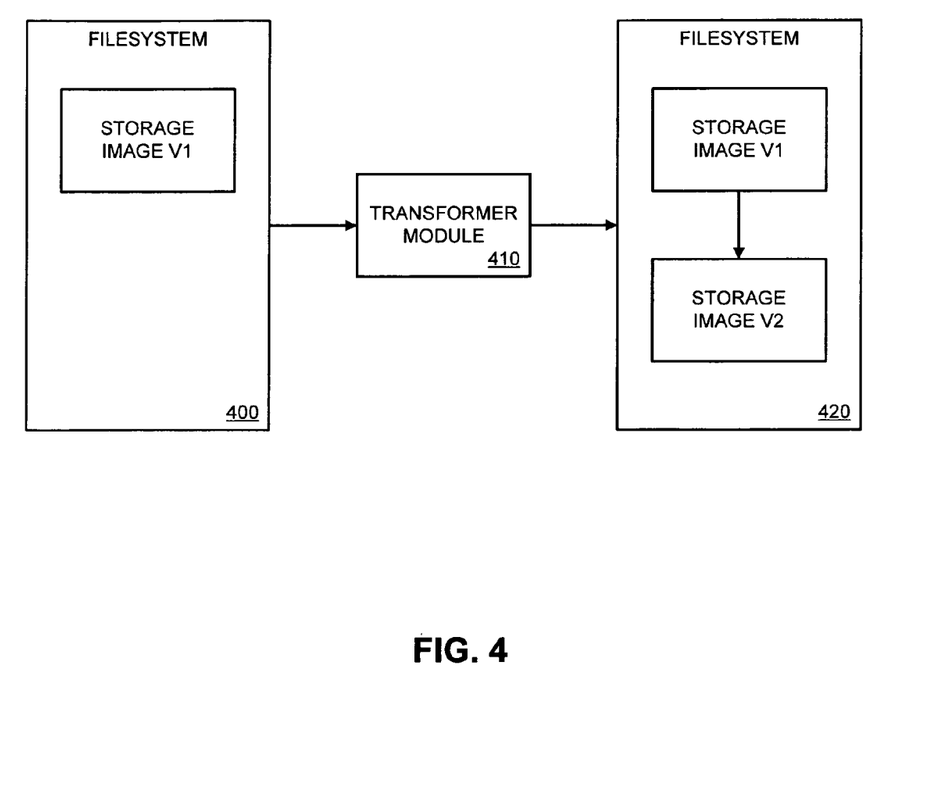
FIG. 4 is a block diagram of an embodiment of a transformer module to transform a filesystem from one version to another.

FIG. 4 is a block diagram of an embodiment of a transformer module to transform a filesystem from one version to another. Filesystems 400 and 420 are examples of filesystems as previously discussed. FIG. 4 represents one manner in which to visualize the transformation of filesystem 400 to filesystem 420, although other manners in which to visualize the transformation are possible. Filesystem 400 includes a storage image v1, which represents the overall data structure of storage area or storage space managed by filesystem 400. Storage image v1 may include one or more logical data structures, for example, aggregates or volumes. Storage image v1 includes the organization of data into blocks and/or files.

In one embodiment storage image v1 represents a last-available release of filesystem 400, meaning a version of filesystem software/firmware by a storage system vendor. Filesystem 400 may reside on a storage server device available from a storage server vendor. The vendor may make changes that allow for an updated version of filesystem software/firmware that will operate on the same hardware. Examples of software/firmware updates include error correction, feature updates, additional features, additional tools, different formatting, etc. Thus, at some point storage image v1 could become an "old" release, meaning another more updated release is available. Similarly, features of a "new" release may be tested and determined to require additional changes, which could mean that storage image v1 is a "new" release that should be "updated" back to a former version.

To provide a conversion of storage image v1 to a different version (including upgrade or revert), the vendor could provide transformer module 410, which represents a transformer module or conversion tool as previously discussed. Transformer module 410 enables filesystem 400 to become changed filesystem 420, in which storage image v2 is generated. Storage image v2 represents one or more new logical data structures generated in the free space of filesystem 420. Storage image v2 may include a different format than storage image v1 that is consistent with the updates available in a different version of filesystem software/firmware. Transformer module 410 includes a translation mechanism to enable the filesystem software/firmware that generated/managed storage image v1 to understand the filesystem software/firmware that generates/manages storage image v2. The translation features of transformer module 410 include the formatting and features of storage image v2 to enable a translation of storage image v1 to storage image v2.

In one embodiment the filesystem change is an upgrade to an updated version. Thus, storage image v2 represents one or more logical data structures generated for a newer version of software/firmware of the software/firmware with which storage image v1 is associated. In another embodiment storage image v2 represents one or more logical data structures generated for an earlier version of software/firmware than the version of software/firmware for with which storage image v1 is associated in conjunction with a revert. In one embodiment the filesystem change is an upgrade from one filesystem to another. In such a case, storage image v2 represents one or more logical data structures generated for different software/firmware from the software/firmware with which storage image v1 is associated. Thus, transformer module 410 could operate for either or both of an upgrade or a revert. Transformer module 410 could be a software module that is loaded into filesystem 400 to convert filesystem 400 to filesystem 420.

In one embodiment transformer module 410 includes a background process. The background process could "walk" through all data of storage image v1 and convert the data part by part into storage image v2. Alternatively, transformer module 410 could be called upon with a request for data within storage image v1, converting the requested data into storage image v2. This approach would be expected to take longer to complete the conversion, and may take much longer depending on the frequency of access of the data in the image. One implementation would include the deletion of the entirety of storage image v1, including any logical data structures, upon conversion of the data structure, instead of converting as storage space becomes necessary. Thus, data storage area that was part of storage image v1 could be reclaimed to be used for storage image v2 via a large-scale deletion, or via incremental freeing of storage resources.

Figure 5:
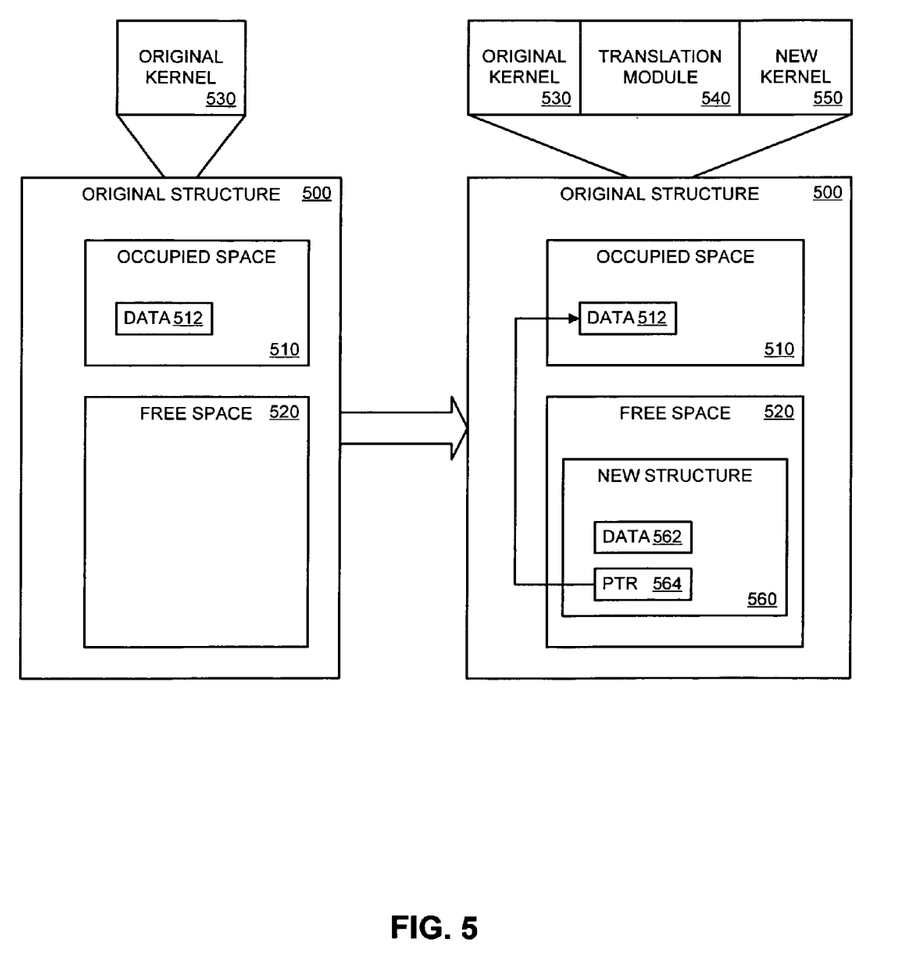
FIG. 5 is a block diagram of an embodiment of a transformation from one logical data structure to another.

FIG. 5 is a block diagram of an embodiment of a transformation from one logical data structure to another. FIG. 5 represents another possible manner to visualize a transformation of a filesystem from one version to another, and more specifically represents the transformation at the data structure level. The data structures depicted, 500 and 560, are examples of logical data structures as previously discussed. Original structure 500 represents a data structure according to a particular format, associated with one version of a filesystem. The filesystem manages original structure 500 according to original kernel 530, which provides the formatting and organization standards of the filesystem.

Original structure 500 includes occupied space 510, and free space 520. Occupied space 510 includes data 512, which represents a file, a data block, a data structure, etc., which represents one or more elements of data stored within original structure 500. There may be many such elements of data within occupied space 510. Free space 520 would normally exist in any filesystem.

As part of a conversion of original structure 500 to a different version (i.e., an upgrade or a revert), the filesystem may have other items loaded into it. Specifically depicted are translation module 540 and new kernel 550. In one embodiment translation module 540 and new kernel 550 are included within a transformation module, as previously described. Translation module 540 includes the information necessary to convert from one format to another, or from one version to another, of the filesystem. New kernel 550 provides the formatting and organization/management standards of the new filesystem version.

To provide the conversion from one version of the filesystem to another, new structure 560 is generated according to the formatting of new kernel 550. New structure 560 is created in free space 520 of original structure 500. The filesystem can create new structure 560 with the additional module loaded into the filesystem, new kernel 550, and fill/populate new structure 560 with translation module 540. Thus, the upgrade occurs from creating new structure 560 according to new kernel 550 and translating or incorporating the data of occupied space 510 into new structure 560.

The filling of new structure 560 can be through a background process, where the filesystem steps through occupied space 510 and converts data for inclusion into new structure 560. This may include a mechanism to delete or remove data from occupied space 510 once converted to new structure 560. One form of conversion of the data may be to copy data 512 to a new location in new structure, data 562. Copying data to a new location can be a useful conversion approach, for example, if data 512 is of an incompatible size with the data elements of new structure 560. For example, suppose new structure 560 stores data in 4 kB blocks. If occupied space 510 were populated with 8 kB data blocks, the block sizes are compatible, because new structure 560 can simply use two 4 kB blocks (which need not be adjacent) to store each data block of occupied space 510. However, if occupied space 510 were populated with 512 byte blocks, the block sizes are incompatible. In this case, one or more blocks from occupied space 510 could be copied over to a data block, for example, data 562, and stored there. Compatible block sizes refer to block sizes that are scaled ratios or exact multiples of one another.

In one embodiment a compatible block size, and especially an exact block size match, may allow for new structure 560 to be populated indirectly by maintaining the data stored in occupied space 510. For example, new structure 560 may include pointer 564 to point to data 512 located in occupied space 510. Reference to data 512 in original structure 500 could be removed in conjunction with the generation of pointer 564. Thus, the data storage space of occupied space 510 could be converted or incorporated into space managed in new structure 560.

Figure 6:
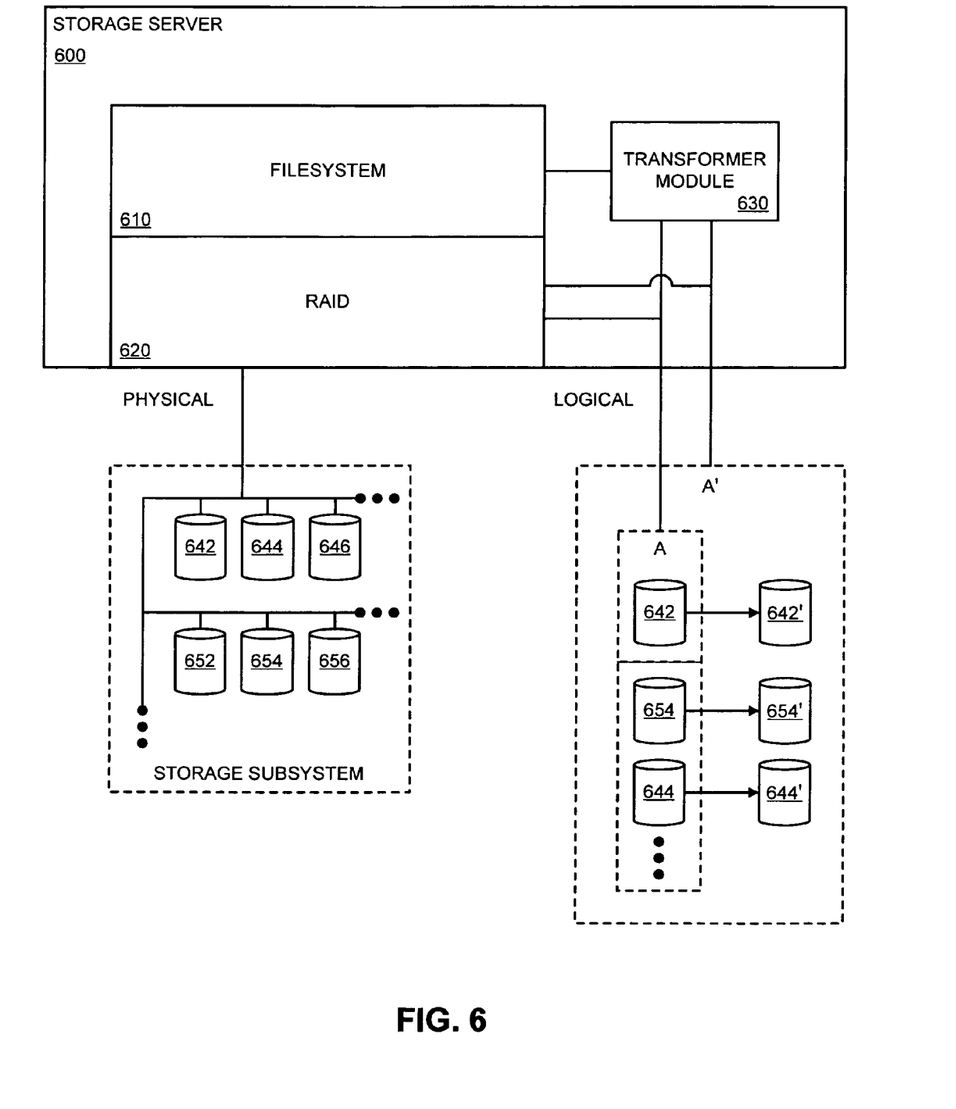
FIG. 6 is a block diagram of an embodiment of a storage server with a transformation module.

FIG. 6 is a block diagram of an embodiment of a storage server with a transformation module. Storage server 600 provides an example of a storage server according to any previously described. Storage server 600 is shown with some of the layers of an operating system. Filesystem 610 provides the management of storage space available to storage server 600. The version of filesystem 610 that is in storage server 600 determines how filesystem 610 manages the storage space. RAID 620 sees/detects the physical storage resources of the system and provides logical/virtual data structures based on those resources. For purposes of description, and not by way of limitation, FIG. 6 will reference disks as the physical resources of the storage subsystem, storage devices as the physical resources of the clients, and RAID groups as the logical data structures. Other and/or additional data structures may be included within the system, and physical resources besides or in addition that shown may be used. RAID 620 provides the logical hierarchy of the system resources, and thus provides the RAID groups.

In one embodiment the physical layout of the disks may be that each group depicted represents disks on a shelf of a rack-mounted storage system. Thus, disks 642-646 may represent one shelf, disks 652-656 a different shelf, and so forth. The grouping of the physical resources and the number of units involved is not to be understood as necessary or typical, but is merely illustrative for purposes of description of the operation of a system having the client storage access as described herein.

RAID group A is shown having disks 642, 654, and 644 as storage resources available within the RAID group. Data that is logically associated with RAID group A will be stored within the disks. In one embodiment storage server 600 includes transformer module 630, through which RAID group A' may be created. RAID group A' may be created within the free space available to filesystem 610. The free space may be free space on disks 642, 654, and 644, as well as, or alternatively, on one or more of the other disks, for example, 656. RAID group A' represents a logical structure associated with a different version of filesystem 610. FIG. 6 depicts logical structures 642', 654', and 644', each of which may or may not be associated with the physical disks having corresponding numbers. For example, logical structure 642' may be created on disk 656, or some other disk. Thus, 642', 654', and 644' represent the transformation of data that was stored on disks 642, 654, and 644 being converted to a different logical structure. As discussed above, the conversion may in one embodiment mean the creation of pointers in a new data structure that points back to data stored on the physical disks. With the transformation of filesystem 610, the physical resources may be exactly the same, but the use of data storage space may be different to reflect the changed format that occurs when converting from one version of filesystem 610 to another.

Figure 7:
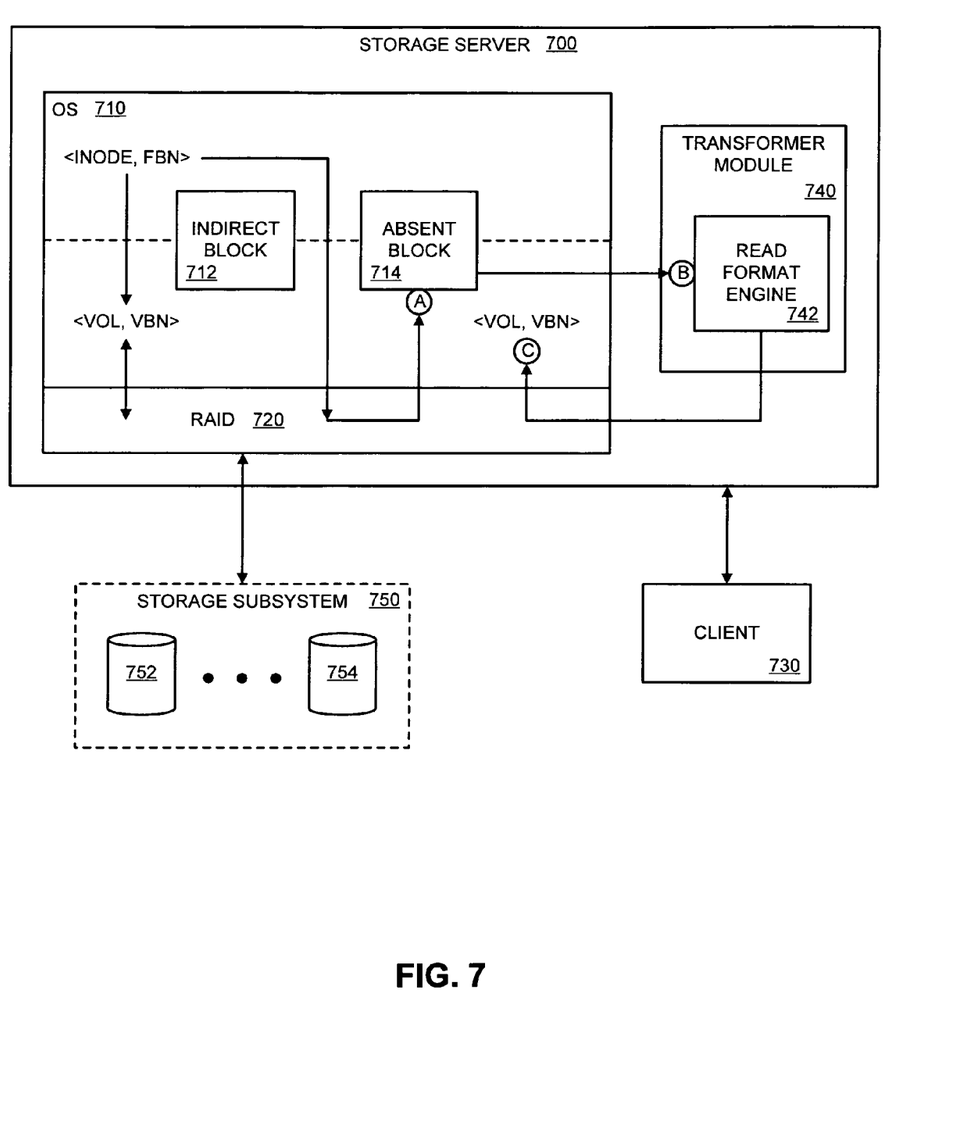
FIG. 7 is a block diagram of an embodiment of a storage server with a transformation module.

FIG. 7 is a block diagram of an embodiment of a storage server with a transformation module. Storage server 700 and transformer module 740 may be example implementations of storage servers and transformer modules, respectively, as previously discussed. FIG. 7 represents one embodiment of a system where a transformation occurs with the use of sparse data structures. A sparse data structure includes a data structure where data may be referenced in an abstract way.

Client 730 represents a computing device that uses the storage managed by storage server 700. Storage subsystem 750 represents a physical subsystem of storage elements on which storage server 700 stores data for access by client 730. Storage subsystem 750 is shown including multiple disks, 752-754. Storage subsystem 750 is visible to RAID 720, which provides logical abstractions of the physical data storage space available in storage subsystem 750. RAID 720 provides the abstractions as available storage to OS 710, and tracks the use of the logical and physical storage.

In one embodiment an access request for data is made by client 730. The access request is likely simply a request for certain data, for example, a file, desired by client 730. The access request can be processed and a lower-level access request, which includes a file block number (fbn) and an indirect node (inode) that points to one or more data blocks having the requested data. The inode may refer to indirect block 712. Indirect block 712 points to data, and translates the <inode,fbn> request into a request for a particular volume and virtual block number, <vol,vbn>. The <vol,vbn> request is forwarded to RAID 720, which knows the physical location of the requested data and enables client 730 to obtain the data. This may be a standard approach to obtain data.

In conjunction with a filesystem conversion, a sparse data structure may be created, where the normal indirect block abstractions are replaced with another layer of abstraction. Thus, the <inode,fbn> request may be generated, which refers to absent block 714, at A. Absent block 714 forwards the <inode,fbn> request to transformer module 740 at B. Transformer module 740 includes read format engine 742, which allows transformer module 740 to process the <inode,fbn> request and generate a <vol,vbn> designation for the data, at C. The <vol,vbn> designation may be to the data storage area in use by the converted filesystem. Thus, the generation of the <vol,vbn> designation may include reference to data of a different format, maintained by a different filesystem kernel within OS 710.

Figure 8:
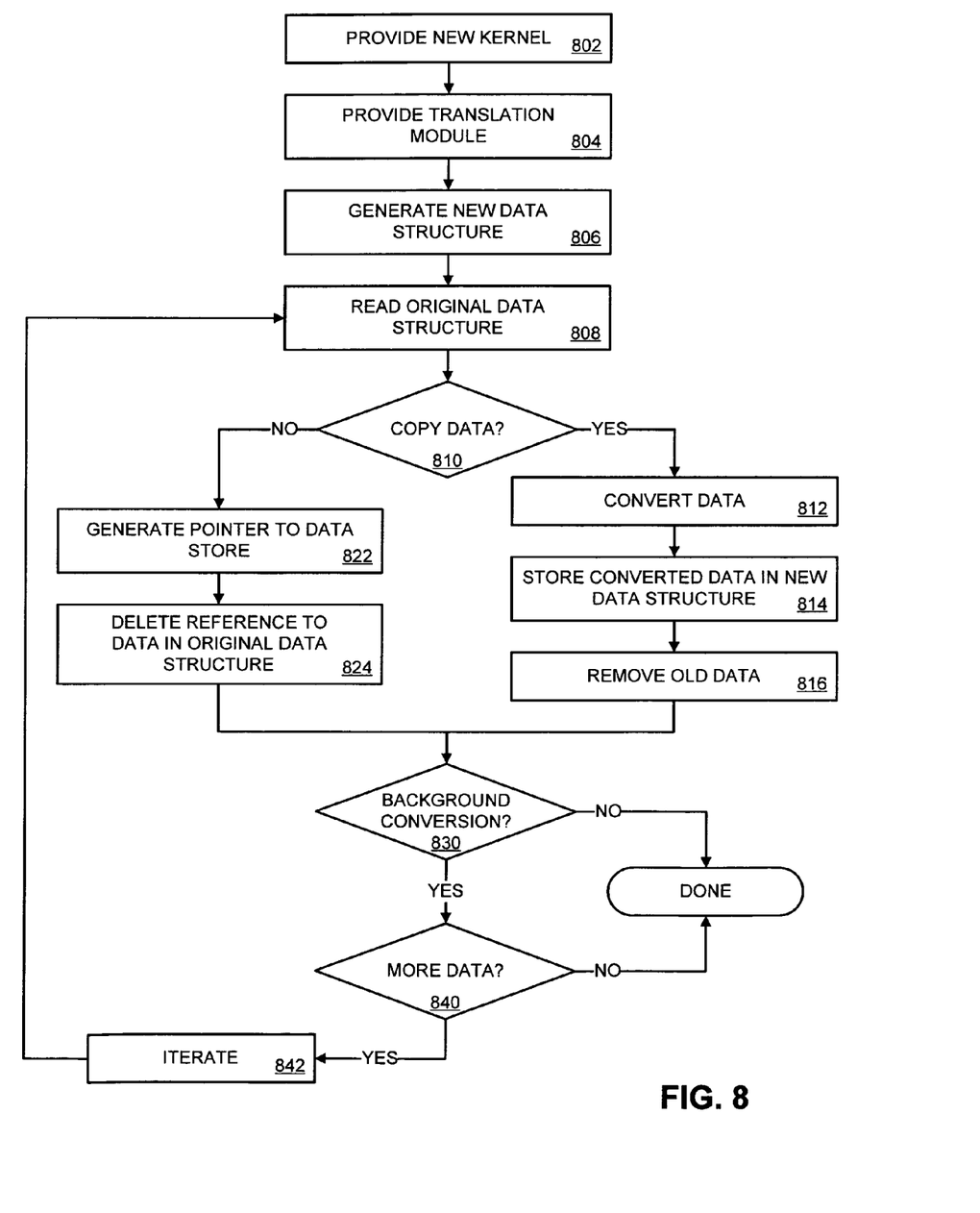
FIG. 8 is a flow diagram of an embodiment of a process for transforming a data structure to another version.

FIG. 8 is a flow diagram of an embodiment of a process that may be executed by the transformer module, for example, to transform a data structure to another version. To perform the transformation, one or more components can be provided to an existing filesystem. The components can be provided by a source of instructions, such as a memory, an article of manufacture, a hardware/firmware components residing on a storage server, etc. For example, a new kernel may be provided, 802. The provided kernel is an operating system core that provides instructions, service calls, software services, etc., for the filesystem to manage its data storage. In conjunction with the kernel, a translation module can be provided, 804. In one embodiment the kernel and translation modules are separate modules, and/or provided separately. Alternatively, they may be provided as a single software entity. The translation module provides translation services, as described above, to convert filesystem data of an original format to the format of the new kernel.

The new kernel becomes operational and generates a new data structure in the free space of the data structures of the original filesystem, 806. The new data structure will be filled with the data from the original filesystem, providing the conversion. To fill the new data structure with the data of the original filesystem, the translation module will read an original data structure to obtain one or more elements of data, 808. Reading the original data may occur in response to a data access request, and/or as part of a background conversion process. A background conversion process refers to a procedure that occurs in the background of an operating system to convert the data from one filesystem to another. The background may be understood as a task that is low on a priority list, meaning that most any other task in the system may take priority over the background task. The key to the background task is that it may continue to operate in the idle time of a system processor, performing its operations until its task is ultimately completed. In this case the task refers to the conversion of the data from one filesystem to the new filesystem with which the new kernel and translation module are associated. The conversion as a background process may in turn be interrupted by a data access request from a client that would cause the conversion of the requested data prior to returning to the background conversion process.

The conversion process of the translation module then determines whether or not to copy the data being read, 810. In one embodiment data will be copied to a new physical data storage location. In another embodiment data will remain in its original data storage location, and be indirectly referenced by the new data structure. If the data is to be copied, the translation module converts the data, 812. Converting the data may include copying data of an incompatible block size to new data block. Converting the data may include otherwise changing its format. The converted data is stored in the new data structure, 814, which refers to incorporating the data into the new logical data structure. Thus, the physical location of the data may change, and the logical data structure associations of the data may also change. When the data is incorporated into the new data structure, the old data is removed or otherwise deleted, 816. Removing the old data may refer to deleting the data from its physical location, as well as removing its logical associations from the original data structure. Data locations that are deleted may be "freed" from the old filesystem, and incorporated as free space available not to the old filesystem, but to the new filesystem.

Data may also be incorporated into the new data structure through indirect reference, for example by use of a pointer. Thus, the translation module generates a pointer to the data store of the desired data, 822. Note that the physical location of the data need not change, as long as the format and the reference to the data location where the data is found is placed under the management of the new filesystem. Thus, reference to the data in the original data structure is removed, 824. The new filesystem may reference the data through the pointer, and thus be "filled" with one or more references to data whose physical storage may remain.

Whether data is to be copied, or merely indirectly referenced, the translation module or the new kernel determines if there is to be a background process for data conversion, 830. If there is no background process to convert data, once the data of interest is converted, the process may end. If there is a background process for converting data, the translation module or new kernel determines if the entire original data structure has been converted, or whether there is more data to convert, 840. If there is more data to convert, the process iterates, 842, until there is no more data, or until some other threshold is reached (e.g., a time limit, a certain number of data elements converted, etc.).

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for converting a first filesystem in a network storage server to a second filesystem, the method comprising:

generating, in response to an upgrade or revert command from a transformer module to convert a requested portion of the first filesystem, a new logical data structure representing a new logical organization of physical storage resources of the network storage server for the second filesystem in free space of an original logical data structure representing an original logical organization of the physical storage resources associated with the first filesystem in the network storage server, the first filesystem and second filesystem each including a set of procedures by which the network storage server can manage data storage, the second filesystem storing and managing units of user data in data blocks that are a smallest unit of user data that can be independently manipulated by the second filesystem, the original logical data structure formatted according to a first format corresponding to the first filesystem, the new logical data structure formatted according to a second format corresponding to the second filesystem;

determining the data block size of the first filesystem and the data block size of the second filesystem, wherein the second format corresponding to the second filesystem has a data block size that is larger than a data block size of the first format corresponding to the first filesystem, or has a data block size that is not an exact multiple of the data block size of the first format, or both;

in response to determining the data block size of the second filesystem is an exact multiple of the data block size of the first filesystem, adjusting the storage of the data block of the first system into a compatible multiple of data blocks of the second filesystem;

in response to determining the data block size of the second filesystem is not an exact multiple of the data block size of the first filesystem, copying data from the first filesystem space to the second filesystem; and incorporating data from the original logical data structure into the new logical data structure in the second format to convert the first filesystem to the second filesystem, wherein the second filesystem is of a different filesystem version or filesystem type from the first filesystem, and wherein the second filesystem is available to serve data requests during the incorporating.

2. A method according to claim 1, wherein the new logical data structure comprises a volume.

3. A method according to claim 1, wherein incorporating data from the original logical data structure into the new logical data structure to convert the first filesystem to the second filesystem comprises performing a filesystem upgrade from a former version to an updated version.

4. A method according to claim 1, wherein incorporating data from the original logical data structure into the new logical data structure to convert the first filesystem to the second filesystem comprises performing a filesystem revert to revert from an updated version to a former version.

5. A method according to claim 1, wherein incorporating data from the original logical data structure into the new logical data structure in the second format to convert the first filesystem to the second filesystem comprises performing data replication of the first filesystem having a data structure that is incompatible with a storage server.

6. A method according to claim 1, further comprising:
determining that a data block of the original logical data structure is unused; and
deleting the unused data block from the original logical data structure.

7. A method according to claim 6, further comprising:
incorporating the data block deleted from the original logical data structure into the new logical data structure as available storage after deleting the data block from the original logical data structure.

8. A method according to claim 1, wherein incorporating the data from the original logical data structure to the new logical data structure includes:
generating a pointer in the new logical data structure to point to the storage space of the data of the original logical data structure; and
deleting reference to the data in the original logical data structure.

9. A method according to claim 1, wherein incorporating the data from the original logical data structure to the new logical data structure includes:
copying data blocks from the original logical data structure into data blocks sized to be a scaled ratio of the data block sizes of the second format.

10. A method according to claim 1, wherein incorporating the data from the original logical data structure to the new logical data structure includes:
reading the data of the original logical data structure;
converting the data into the second format; and
storing the data in storage space managed by the new logical data structure.

11. An article of manufacture comprising a machine-accessible storage medium storing content to provide instructions, which when executed result in a machine performing a process including:
creating, in response to an upgrade or revert command from a transformer module to convert a requested portion of an original filesystem, a new filesystem in free space of the original filesystem including building in the free space one or more logical data structures representing a logical organization of physical storage resources, the original filesystem and new filesystem each including a set of procedures by which a processing device can manage data storage, the new filesystem stores and manages units of user data in data blocks that are a smallest unit of user data that can be independently manipulated by the new filesystem, the new filesystem having a new format different from the original filesystem to manage data access to the free space in accordance with the new format of the new filesystem;
determining the data block size of the original filesystem and the data block size of the new filesystem, the new format having a data block size that is larger than a data block size of an original format of the original filesystem, or having a data block size that is not an exact multiple of the data block size of the original format, or both;
in response to determining the data block size of the new filesystem is an exact multiple of the data block size of the original filesystem, adjusting the storage of the data block of the first system into a compatible multiple of data blocks of the new filesystem; and
in response to determining the data block size of the new filesystem is not an exact multiple of the data block size of the original filesystem, iteratively copying data of the original filesystem, converting the data to the new format of the new filesystem, and incorporating the data from the original filesystem into the free space managed by the new filesystem.

12. An article of manufacture according to claim 11, wherein creating the new filesystem comprises creating a sparse volume in the free space of the original filesystem, and wherein incorporating the data from the original filesystem into the free space comprises generating absent blocks to point to data of the original filesystem.

13. An article of manufacture according to claim 11, wherein converting the data to the new format of the new filesystem comprises copying data from a block size incompatible with the new format of the new filesystem to a block size compatible with the new format of the new filesystem.

14. An article of manufacture according to claim 11, wherein deleting the converted data comprises removing the data space of the deleted data from the original filesystem and making the data space available to the new filesystem.

15. A storage server comprising:
an original filesystem having an original virtual data structure representing an original grouping of physical storage resources of the storage server, the original filesystem having free space and an original kernel providing an original format and organization standards of the original filesystem;
a new filesystem having a new virtual data structure representing a new grouping of the physical storage resources of the storage server, the new filesystem having a new format and configured to store and manage units of data in data blocks that are a smallest unit of user data that can be independently manipulated by the new filesystem, the new filesystem located in the new virtual data structure in the free space of the original filesystem, and the new format having a data block size that is larger than a data block size of the original format, or having a data block size that is not an exact multiple of the data block size of the original format, or both; and
a transformer module to generate an upgrade or revert command to convert a requested portion of the original filesystem to the new filesystem, to generate the new filesystem and to transform the data from the original virtual data structure of the original filesystem into the new virtual data structure according to the new format by determining the data block size of the original filesystem and the data block size of the new filesystem, and in response to determining the data block size of the new filesystem is an exact multiple of the data block size of the first filesystem, adjusting the data block of the original system into a compatible multiple of data blocks of the new filesystem, and in response to determining the data block size of the new filesystem is not an exact multiple of the data block size of the original filesystem, copying data from the original filesystem space to the second filesystem space, the original filesystem and new filesystem each including a mechanism by which the storage server can manage data storage, wherein the storage server is configured to make available the new filesystem to serve data requests during the transforming.

16. A storage server according to claim 15, wherein the transformer module comprises a new kernel to execute the new filesystem according to the new format, and a translation module to convert the data from the original filesystem to the new filesystem.

17. A storage server according to claim 16, the translation module to further iteratively step through the original virtual data structure of the original filesystem and convert the original virtual data structure block-by-block into the new format to be stored in the new virtual data structure.

18. A storage server according to claim 15, wherein to transform the data into the new virtual data structure according to the new format comprises to create a pointer to the data of the original virtual data structure, the pointer to be stored in the new virtual data structure.

19. A storage server according to claim 15, wherein to transform the data into the new virtual data structure according to the new format comprises to copy data from the original virtual data structure of the original filesystem of one block size into data blocks of a different size.

20. A method according to claim 1, wherein the original logical data structure comprises a volume.

21. A method according to claim 1, further comprising creating a sparse volume in the free space of the first filesystem, wherein generating a new logical data structure for the second filesystem in free space of an original logical data structure of the first filesystem comprises generating absent blocks in the sparse volume to point to data of the first filesystem.

22. A method according to claim 1, wherein said method is performed in a background process of the network storage server which is not disruptive to servicing of client-initiated data access requests by the network storage server.

23. An article of manufacture according to claim 11, wherein said process is a background process of the machine.

24. A storage server according to claim 15, wherein the transformer module is configured to:
    create a sparse volume in the free space of the original filesystem; and
    generate absent blocks in the sparse volume to point to data of the original filesystem.

25. A storage server according to claim 15, wherein the transformer module is configured to generate the new filesystem and transform the data from the original virtual data structure of the original filesystem into the new virtual data structure in a background process of the storage server which is not disruptive to servicing of client-initiated data access requests by the storage server.

26. The method of claim 1, wherein the first filesystem and the second filesystem are each configured to execute read/write operations on the respective original logical data structure and new logical data structure.

* * * * *

UNITED STATES PATENT AND TRADEMARK OFFICE
CERTIFICATE OF CORRECTION

| | | |
|---|---|---|
| PATENT NO. | : 8,620,970 B2 | Page 1 of 1 |
| APPLICATION NO. | : 11/542777 | |
| DATED | : December 31, 2013 | |
| INVENTOR(S) | : Robert English et al. | |

It is certified that error appears in the above-identified patent and that said Letters Patent is hereby corrected as shown below:

On the Title page, in Item (73), delete "Network Appliance, Inc." and insert -- NetApp, Inc. --, therefor.

In the Claims

In column 14, line 59, in claim 1, delete "system" and insert -- filesystem --, therefor.

In column 16, line 16, in claim 11, delete "system" and insert -- filesystem --, therefor.

In column 17, line 3, in claim 15, delete "system" and insert -- filesystem --, therefor.

Signed and Sealed this
Sixth Day of May, 2014

Michelle K. Lee
*Deputy Director of the United States Patent and Trademark Office*